Feb. 1, 1949.     C. R. JAMISON     2,460,506
LANDING GEAR FOR AIRPLANES
Filed Oct. 26, 1945     3 Sheets-Sheet 1

Inventor
Charles R. Jamison
By Wilfred E. Lawson
Attorney

Feb. 1, 1949.  C. R. JAMISON  2,460,506
LANDING GEAR FOR AIRPLANES
Filed Oct. 26, 1945  3 Sheets-Sheet 3

Inventor
Charles R. Jamison

By Wilfred E. Lawson
Attorney

Patented Feb. 1, 1949

2,460,506

UNITED STATES PATENT OFFICE 2,460,506

LANDING GEAR FOR AIRPLANES

Charles R. Jamison, Morgantown, W. Va.

Application October 26, 1945, Serial No. 624,708

8 Claims. (Cl. 244—50)

This invention relates to aircraft or airplane undercarriages or landing gear and is directed primarily to improvements in landing gear designed to be adjusted or set in such a manner as to permit a plane to be landed on and to run lengthwise of a landing strip, in a crosswind.

The present invention is applied to aircraft landing gear of the three wheel or tricycle type and it is a principal object of the present invention to provide an improved and simplified control mechanism for the landing elements, whether they be in the form of wheels, skids, floats and the like, wherein novel means is provided for effecting desired turning of the ground contacting elements and for maintaining the same in desired parallel relation without necessitating the changing to any material extent of the trusses and standards at present employed for maintaining the wheels or other ground contacting elements in position.

A further object of the invention is to provide an undercarriage or landing gear structure of the character stated wherein a simple but reliable mechanism is provided for facilitating the locking of the main landing elements in a fore and aft position while permitting the steering movement of the forward landing element whereby to enable the pilot to steer the craft when the same is groundborne, that is, when the craft is resting upon or in contact with the ground.

A still further object of the invention is to provide an improved landing gear mechanism by means of which the ground contacting elements may be readily turned on vertical axes to any desired parallel relation and whereby such ground contacting elements may also be supported for vertical swinging movement to facilitate their retraction and extension respectively after the craft takes off and before the craft lands, without interference in any manner by the means provided for turning such landing elements.

Other objects and advantages of the invention will become apparent as the description of the same proceeds and the invention will be best understood from a consideration of the following detailed description taken with the accompanying drawings forming a part of this specification, with the understanding, however, that the invention is not confined to a strict conformity with the showing of the drawings but may be changed or modified so long as such changes or modifications mark no material departure from the salient features of the invention as expressed in the appended claims.

Figure 1:
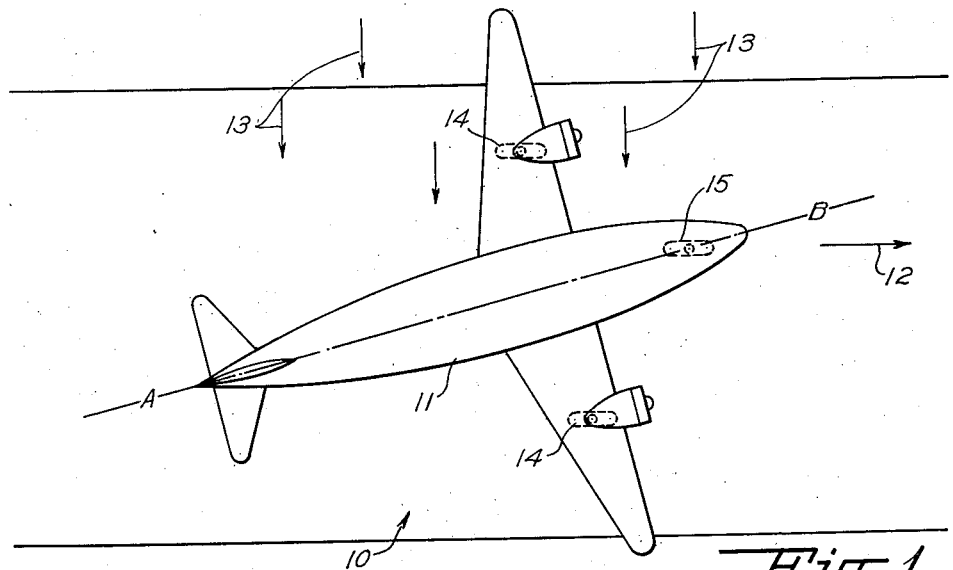
Figure 1 illustrates diagrammatically the conditions which may arise during the landing and take-off of an aircraft across wind.

Referring now more particularly to the drawings, Figure 1 illustrates an air strip generally designated 10 upon which is shown or illustrated, diagrammatically, an air ship generally designated 11, landing in a crosswind and in the direction indicated by the arrow 12. The direction of the wind here illustrated is indicated by the arrows 13 and it will be readily apparent to those properly trained in the handling of aircraft how the landing wheels of the craft must be set relative to the longitudinal axis of the craft so that in landing under the conditions illustrated excessive side loads or strain on the undercarriage may be avoided. It will be readily apparent from a consideration of Figure 1 that the direction of travel of the aircraft is shifted from the longitudinal axis A—B of the craft and the free ground contacting elements of the landing gear, here shown as wheels, being the main landing wheels 14 and the forward or nose wheel 15, are in substantial parallelism. Thus the craft in landing in the manner shown will have a "crablike" movement which is linear in the direction of the arrow 12.

Figure 2:
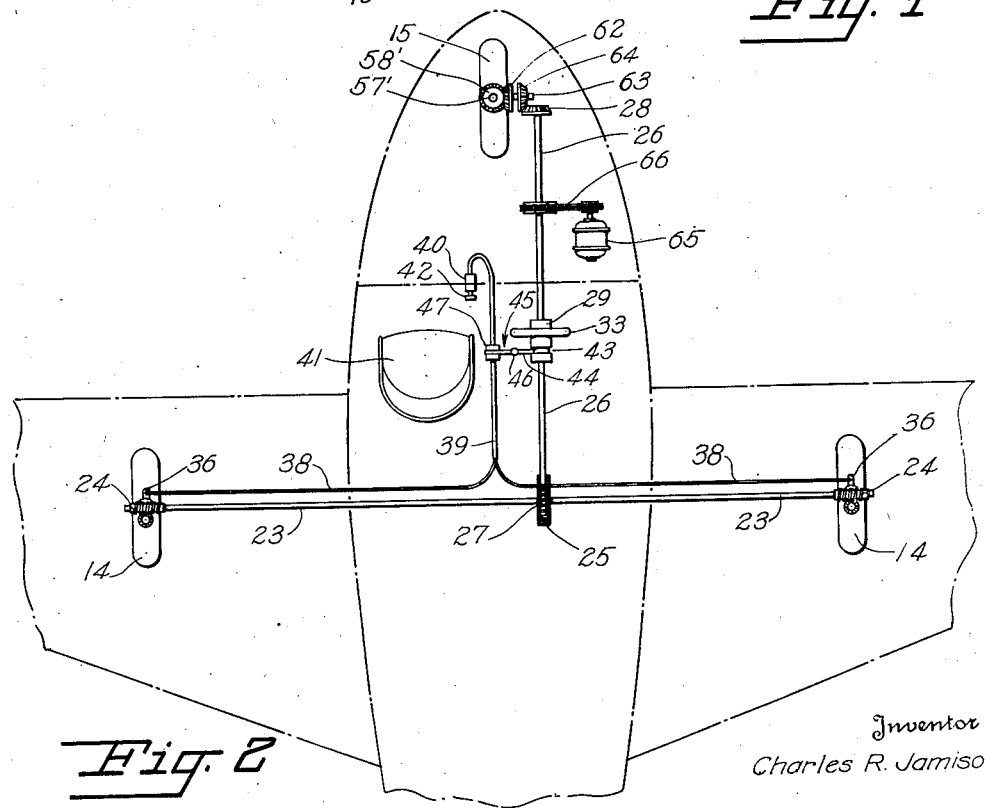
Figure 2 illustrates in broken outline the forward portion of an airplane structure showing positioned therein the undercarriage control mechanism of the present invention.

As is clearly shown in Figures 1 and 2 the ground contacting elements, here illustrated as wheels 14 and 15 are substantially in a triangular arrangement, the wheels 14 constituting the main landing elements and the wheel 15 constituting the advance landing and securing element. These elements when lowered for use are mounted for turning or rotation on parallel vertical axes and, as will be hereinafter more fully disclosed, they are also supported for vertical swinging movement so that they may be retracted following takeoff of the aircraft and lowered or extended for landing.

Figures 3, 4:
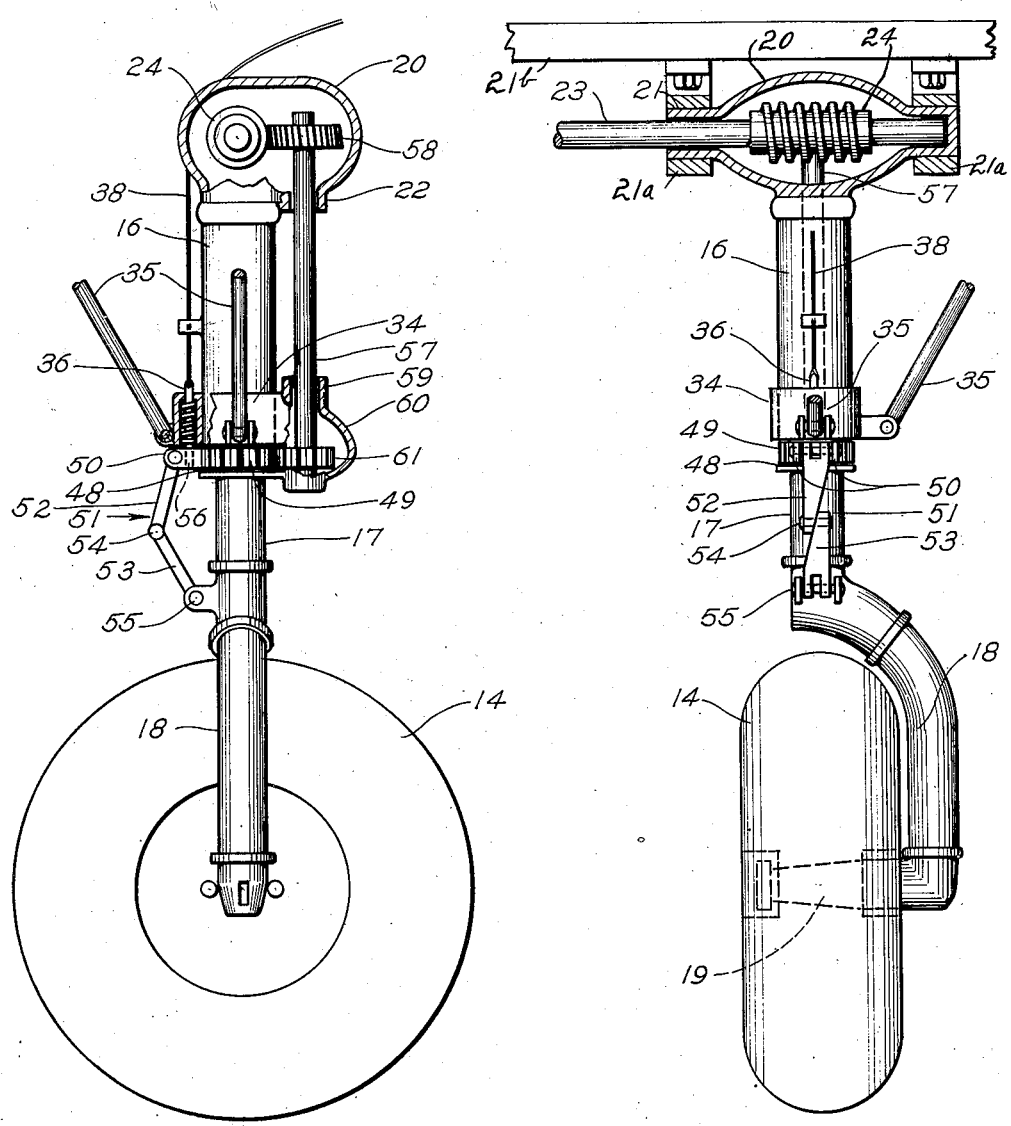
Figure 3 illustrates a wheel mounting and control means therefor constructed in accordance with the present invention, the wheel being in side elevation and comprising one of the two laterally spaced wheel units.
Figure 4 is a view in front elevation of the unit structure shown in Figure 3, portions being in section.
Figure 5:
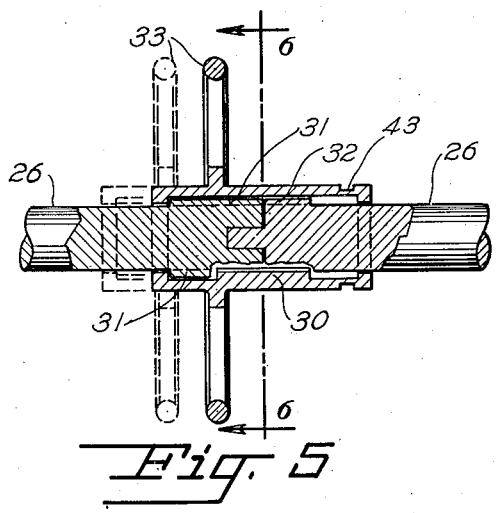
Figure 5 is a detail view partly in section of the hand wheel control clutch.
Figure 6:
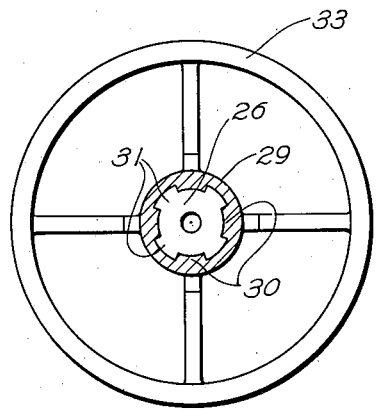
Figure 6 is a sectional view on the line 6—6 of Figure 5.
Figure 7:
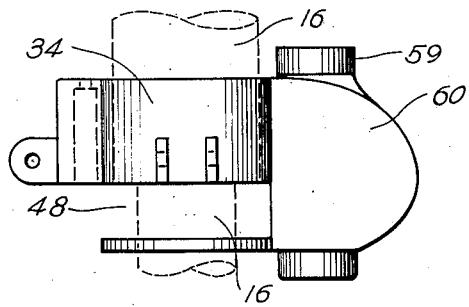
Figure 7 is a detail illustrating the mounting for the wheel actuating gear supported concentrically with the wheel post.
Figure 8:
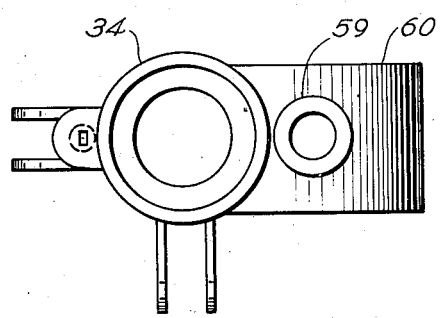
Figure 8 is a view in plan of the mounting shown in Figure 7.
Figure 9:
Figures 9 and 10 are views showing the wheel actuating gear respectively in side elevation and in top plan.
Figure 10:
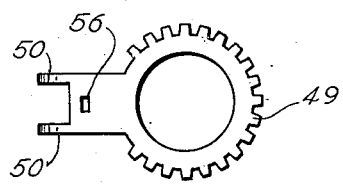

As shown in Figure 4 the wheels and supporting gear are mounted in a conventional manner so that they may be swung in a vertical plane to be raised and lowered. Such supporting gear includes a cylinder 16, into which is extended from one end, a leg post 17 which, at its lower end joins the offset arm 18 which carries at its free end the axle 19 on which the wheel is rotatably mounted. The post 17 is telescopically joined with the cylinder to move in and out of the latter and shock absorbing means, not shown, is housed in the cylinder to cushion sudden inward movements or upward movements of the wheel and the leg post. The details of construction of such shock absorbing mechanism are not illustrated in view of the fact that the same forms no part of the present invention and is standard structure and well known to those versed in the art and, therefore, it is believed that illustration and detailed description of the same is unnecessary.

Joined with the upper end of each cylinder is a gear housing head 20 having the horizontal bearing guides or sleeves 21 and, in a position offset from the adjacent cylinder 16, a downwardly directed bearing sleeve 22, the purpose of which will be hereinafter described. The bearing guides or sleeves are supported in suitable bearings 21a, carried by a fixed part 21b of the fuselage.

The wheel units 14 are disposed at opposite sides of the longitudinal center of the body of the airship shown in Figure 2 and extending transversely of the ship body is the shaft 23, each end of which passes through a bearing sleeve 21 of the two heads 20 forming parts of the two oppositely disposed wheel units.

Each end of the transverse shaft 23 carries, within the gear housing or head 20 into which it extends, a worm gear 24 and intermediate its ends the shaft has secured thereto a worm wheel 25.

Extending longitudinally of the ship structure is the forwardly extending or fore and aft shaft 26, the rear end of which carries a worm gear 27 while the forward end has secured thereto, within the gear housing 20 forming a part of the structure of the forward wheel 15, a miter gear 28. The shaft 26 is in two alined sections which are permanently coupled together so that one section may be turned independently of the other or when locked together in the manner hereinafter described the sections turn as a single shaft.

The means here illustrated for locking together the forward and rear sections of the shaft 26 comprises a sleeve 29 having formed upon the inner surface and extending longitudinally thereof through a portion of its length, the splines 30. This sleeve straddles the abutting ends of the two sections of the shaft 26 and the forward section is provided with the longitudinally extending ribs or splines 31 with which the splines 30 of the sleeve are permanently engaged, while the rear section of the shaft has corresponding splines 32 with which the splines 30 of the sleeve may be selectively coupled by the acts of shifting the sleeve back and forth upon the shaft.

In order to facilitate this shifting of the sleeve and also to facilitate the hand turning of the forward end portion of the shaft 26 when the sleeve is shifted forwardly so that the splines thereof are disconnected from the splines 32, there is formed integral with the sleeve, the hand wheel 33.

The lower end of each of the cylinders 16 which forms a part of the gear for a wheel 14, has secured therearound, a collar 34 with which are connected the struts 35 by means of which the wheel is swung vertically by suitable control mechanism, not shown, which forms standard structure.

Each of the collars 34 is provided with a guide 35 in which is slidably mounted a lock pin 36 which is normally urged downwardly by a spring 37.

The lock pins 36 are connected with flexible control wires or cables 38 which join a single control cable 39 leading to the forward part of the airplane structure and slidably mounted in a suitable guide 40 positioned conveniently close to the pilot's seat 41 of the airplane to enable the pilot to cause reciprocation of the cable for the extension and retraction of locking bolts. The end of the cable is provided with a suitable button 42 for facilitating its actuation.

The clutch sleeve 29 is provided with an encircling channel or groove 43 in which is loosely engaged the bifurcated end portion 44 of a pivotally mounted shift fork which is generally designated 45 and which is pivotally supported at 46 adjacent to the sleeve. The outer end of the shift fork, that is, the end remote from the actual fork or bifurcation 44, is coupled with the shift cable 39 as indicated at 47 so that when the shift cable button 42 is pulled out to effect the shifting of the lock pins 36 upwardly against the tension of the control springs 37 the clutch sleeve will be shifted rearwardly so as to establish a locking connection between the two sections of the shaft 29.

Around the lower end of each of those cylinders 16 to which a collar 34 is secured, is formed a circular guide channel or bearing channel 48 in which is mounted a gear 49. A portion of this gear is formed to provide two radially outwardly extending spaced ears 50 and between these ears is pivotally secured one end of an articulated arm which is generally designated 51 and which comprises the upper and lower halves 52 and 53 respectively which are pivotally coupled together as at 54. The other or lower end of this articulated arm is pivotally joined as at 55 to the lower end of the leg post 17.

Each of the gears 49 is provided with a keeper slot 56 which is located on a radial line passing between the ears 50 and is designed to receive the lower end of the lock pin 36, which is adjacent thereto. These parts are so adjusted that when the ground engaging wheel is set in a straight forward position or parallel with the center line of the ship, the lock pin can engage in the keeper slot and hold the wheel in this position. When the lock pin is retracted the wheel is free to rotate and the application of rotary power to the gear 49 transmits such power to the leg post 17 through the arm 51 to effect the desired turning of the wheel.

The wheels 14 are turned from and by the shaft 23 when rotary motion is transmitted thereto through the sectional shaft 26. The transmission of the desired power from the shaft 23 to the gears 49 is effected through the medium of a short vertical shaft 57 which is located outside the adjacent cylinder 19 and parallel therewith and has its upper end extending through the bearing 22 into the housing 20. The upper end of this shaft 57 carries a worm wheel 58 which meshes with the adjacent worm gear 24. The lower end of the shaft 57 passes through a suitable bearing 59 into a housing 60 where it carries a pinion gear 61 which is in mesh with the gear 49.

The control gear associated with the front wheel or forward wheel 15 is substantially the same as that associated with the wheels 14 with the exception that the pin locking means for the post gear 49 is not employed and the gear secured to the upper end of the vertical shaft, designated 57' and corresponding to the shaft 57, is of the miter type as indicated at 58' and has toothed connection with a corresponding gear 62 supported upon a stub shaft 63 which is rotatably mounted in the gear housing at the top end of the wheel post cylinder. This stub shaft carries a second miter gear which is designated 64 and with which the gear 28 connects to transmit motion from the shaft 29 to the leg post with which the front wheel 15 is connected.

For the mechanical operation of the ground contacting elements of the landing gear there is provided a motor 65 which is operatively coupled through the driving connection 66 with the forward end portion of the two part shaft 29.

In the operation of the mechanism, when the locking pin control button 42 is pushed in the flexible cables 39 and 38 project or cause the control springs 35 to project the pins downwardly into their keeper slots 56, it being understood, of course, that the main landing elements 14 have previously been set so as to be parallel with the longitudinal axis of the ship. This action causes the clutch shift fork 45 to be oscillated in a direction to move the clutch sleeve 29 forwardly thus disconnecting the clutch sleeve from the rear end portion of the shaft 29. Positive engagement is still maintained, however, with the forward end portion of the shaft so that the operator of the aircraft will then be able to steer the craft, when it is groundborne, by the hand manipulation of the wheel 33 thereby transmitting rotary motion to the forward end only of the shaft 29 and consequently to the forward wheel 15 only.

When the wheels are to be turned as a group so that all of the wheels will lie in parallel planes, after the forward wheel 15 has been returned to straight ahead position, the button 42 is shifted inwardly so as to retract the locking pins 38. This action simultaneously shifts the clutch sleeve 29 rearwardly so as to lock the two sections of the shaft 29 together, after which the rotation of the shaft 29 either by the hand wheel 33 or the motor 65, will effect simultaneous turning of all of the wheels on the parallel axes of their leg posts so that the wheels may be set at any desired angular disposition with respect to the longitudinal axis of the airship.

I claim:

1. In an aircraft having main laterally spaced landing elements and a longitudinally spaced landing element, the elements being supported for vertical swinging movement and for turning on parallel axes when in landing or takeoff position; means interconnecting all of said elements for simultaneous turning on said axes from planes paralleling the longitudinal axis of the aircraft to diagonal parallel positions, means for selectively locking the laterally spaced elements only when such elements are set in position parallel with the longitudinal axis of the craft, and means acting simultaneously with the locking of the laterally spaced elements for preparing the longitudinally spaced element for free steering motion.

2. In an aircraft having main laterally spaced landing elements and a longitudinally spaced landing element, the elements being supported for vertical swinging movement and for turning on parallel axes when in landing or takeoff position; a shaft coupling the laterally spaced elements for unitary turning on said axes, a shaft forming a driving coupling between the first shaft and the longitudinally spaced element, means for driving said shafts to effect the turning of the elements on said axes from planes paralleling the longitudinal axis of the aircraft to diagonal parallel positions, the second mentioned shaft being in two sections, a locking coupling between said sections adapted to be shifted between locking and unlocking positions, said coupling when in unlocking position being operatively joined with the section of the second shaft which is coupled with the longitudinally spaced element, means facilitating turning the coupling and the said section of the second shaft, and means for locking the laterally spaced elements only when such elements are set in a position paralleling the longitudinal axis of the craft and when said coupling is in unlocked position.

3. A mechanism of the character stated in claim 2, wherein said means for locking the laterally spaced elements comprises reciprocable latching means, and means operating simultaneously with the actuation of said latching means into locking position to effect the shifting of the locking coupling to the stated unlocking position.

4. A mechanism of the character stated in claim 2, including a shiftable member operatively coupled with said locking coupling, and an operative coupling between said shiftable member and the said means for locking the laterally spaced elements, functioning to shift the locking coupling to unlocking position simultaneously with the locking of the laterally spaced elements.

5. In an aircraft having main laterally spaced landing elements and a longitudinally spaced landing element, said elements being supported for turning on parallel axes; a shaft extending transversely of the aircraft, a short vertical shaft rotatably supported adjacent to each of said elements for rotation on an axis paralleling said axes, a gear coupling between each end of said first shaft and the upper ends of the shafts adjacent to the laterally spaced elements, a gear coupling between the lower end of each of said vertical shafts and the adjacent landing element, a shaft paralleling the longitudnal axis of the aircraft, a gear coupling between one end of the last mentioned shaft and said transverse shaft, a gear coupling between the other end of the shaft which parallels the longitudinal axis of the aircraft and that vertical shaft adjacent to the said longitudinally spaced landing element, and means coupled with the said shaft which parallels the longitudinal axis for imparting rotary motion therethrough to the other shafts to effect simultaneous turning of the landing elements upon their turning axes.

6. A mechanism of the character stated in claim 5, wherein the said shaft which parallels the longitudinal axis of the craft is in two parts, a shiftable clutch means between the said two parts which, when shifted in one direction, disconnects the parts but maintains its connection with the part which is operatively coupled with the said longitudinally spaced landing element, means carried by the clutch means for facilitating the turning of the last mentioned part, and means for effecting the locking of the main laterally spaced landing elements upon the shifting of the clutch means in the said one direction.

7. A mechanism of the character stated in claim 5, in which the said landing elements are supported for vertical swinging movement and the gear connections between the said vertical shafts and the shafts adjacent thereto are of the worm type permitting vertical swinging of the landing elements.

8. A mechanism of the character stated in claim 5, in which each of said landing elements includes a cylinder and a leg post slidably mounted therein and the coupling between each of the landing elements and the adjacent vertical shaft comprises a gear rotatably supported upon and encircling the cylinder, a gear pinion carried by the adjacent vertical shaft and connected with said encircling gear and an articulated arm connected at one end with the said encircling gear and having its other end pivotally connected with said post.

CHARLES R. JAMISON.

REFERENCES CITED

The following references are of record in the file of this patent:

UNITED STATES PATENTS

| Number | Name | Date |
| --- | --- | --- |
| 1,844,186 | Short | Feb. 9, 1932 |
| 2,222,850 | Maclaren | Nov. 26, 1940 |